US012592486B2

(12) United States Patent
Singh et al.

(10) Patent No.: US 12,592,486 B2
(45) Date of Patent: Mar. 31, 2026

(54) DISTRIBUTED CONTROL SYSTEM FOR BEAM STEERING APPLICATIONS

(71) Applicant: KYOCERA AVX Components (San Diego), Inc., San Diego, CA (US)

(72) Inventors: Abhishek Singh, San Diego, CA (US); Laurent Desclos, San Diego, CA (US)

(73) Assignee: KYOCERA AVX Components (San Diego), Inc., San Diego, CA (US)

( * ) Notice: Subject to any disclaimer, the term of this patent is extended or adjusted under 35 U.S.C. 154(b) by 487 days.

(21) Appl. No.: 17/958,870

(22) Filed: Oct. 3, 2022

(65) Prior Publication Data

US 2023/0061805 A1 Mar. 2, 2023

Related U.S. Application Data

(63) Continuation of application No. 17/233,862, filed on Apr. 19, 2021, now Pat. No. 11,462,830, which is a continuation of application No. 15/828,275, filed on Nov. 30, 2017, now Pat. No. 10,985,462.

(60) Provisional application No. 62/428,491, filed on Nov. 30, 2016.

(51) Int. Cl.

| | |
|---|---|
| ***H01Q 5/378*** | (2015.01) |
| ***H01Q 1/52*** | (2006.01) |
| ***H01Q 3/26*** | (2006.01) |
| ***H01Q 13/08*** | (2006.01) |
| ***H01Q 13/20*** | (2006.01) |
| ***H01Q 19/00*** | (2006.01) |

(52) U.S. Cl.

CPC ............ *H01Q 5/378* (2015.01); *H01Q 1/523* (2013.01); *H01Q 3/2611* (2013.01); *H01Q 3/2629* (2013.01); *H01Q 13/08* (2013.01); *H01Q 13/206* (2013.01); *H01Q 19/005* (2013.01)

(58) Field of Classification Search

CPC ...... H01Q 5/378; H01Q 1/523; H01Q 3/2611; H01Q 3/2629; H01Q 13/08; H01Q 13/206; H01Q 19/005

See application file for complete search history.

(56) References Cited

U.S. PATENT DOCUMENTS 6,765,536 B2 7/2004 Phillips et al.
6,987,493 B2 1/2006 Chen
7,068,234 B2 6/2006 Sievenpiper
(Continued)

FOREIGN PATENT DOCUMENTS

WO WO 2014/165320 10/2014
WO WO-2015024488 A1 * 2/2015 .............. H01Q 3/24

*Primary Examiner* — David Bilodeau
(74) *Attorney, Agent, or Firm* — Dority & Manning, P.A.

(57) ABSTRACT

A technique is described where the switch and/or tunable control circuit for use with an active multi-mode antenna is positioned remote from the antenna structure itself for integration into host communication systems. Electrical delay and impedance characteristics are compensated for in the design and configuration of transmission lines or parasitic elements as the active multi-mode antenna structure is positioned in optimal locations such that significant electrical delay is introduced between the RF front-end circuit and multi-mode antenna. This technique can be implemented in designs where it is convenient to locate switches in a front-end module (FEM) and the FEM is located in vicinity to the transceiver.

18 Claims, 15 Drawing Sheets

Algorithm for Multiple Modal antenna control resident in microprocessor in FEM

(56) References Cited

U.S. PATENT DOCUMENTS

| | | | | |
|---|---|---|---|---|
| 7,215,289 | B2 * | 5/2007 | Harano | H01Q 5/371 343/702 |
| 7,773,035 | B2 * | 8/2010 | Murata | H01Q 3/24 343/702 |
| 7,911,402 | B2 | 3/2011 | Rowson et al. | |
| 7,933,562 | B2 | 4/2011 | Rofougaran | |
| 8,362,962 | B2 * | 1/2013 | Rowson | H01Q 3/44 343/745 |
| 8,446,318 | B2 | 5/2013 | Ali et al. | |
| 8,648,755 | B2 | 2/2014 | Rowson et al. | |
| 8,928,530 | B2 | 1/2015 | Achour | |
| 9,190,733 | B2 | 11/2015 | Desclos | |
| 9,240,634 | B2 | 1/2016 | Rowson et al. | |
| 9,439,151 | B2 | 9/2016 | Zhu et al. | |
| 2014/0071008 | A1 * | 3/2014 | Desclos | H01Q 19/021 343/745 |
| 2018/0351255 | A1 * | 12/2018 | Singh | H01Q 3/2629 |

* cited by examiner

Multiple Modal antennas integrated with Front-end modules

A Modal antenna capable of generating multiple radiation patterns from a single port antenna
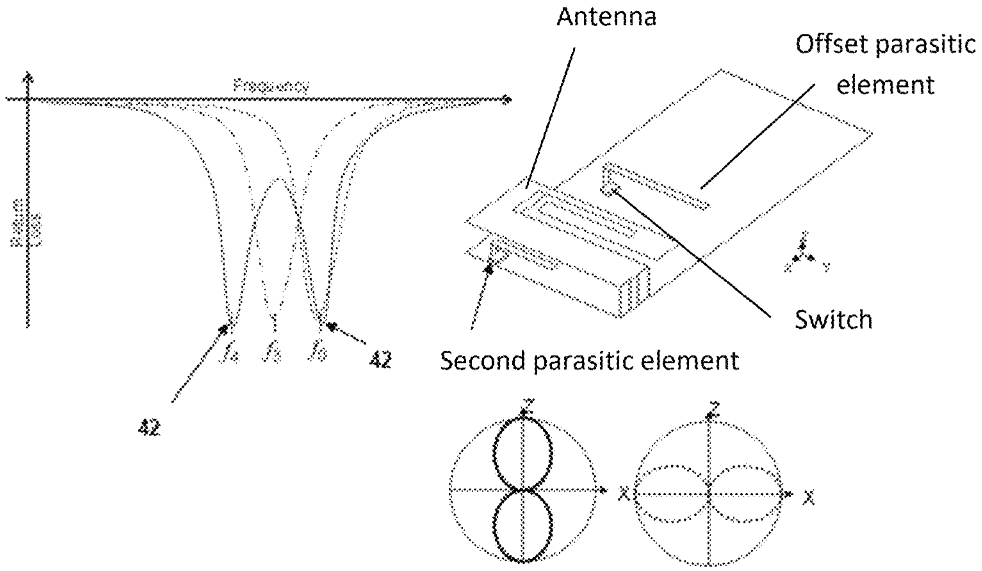
Figure 2a.
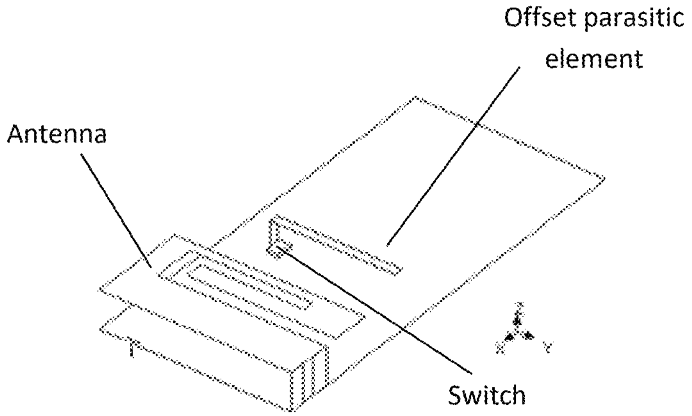
Figure 2b. Alternate configuration Modal antenna with switch integrated in Front-end module High impedance line used to connect switch to parasitic element Transformer circuit implemented to optimize switch/impedance line junction Transformer circuit implemented to optimize impedance line/parasitic element junction Second parasitic element implemented to provide coupling mechanism from switch to first parasitic element to antenna element Non-parallel parasitic elements implemented Three parasitic element configurations Elevated conductor implemented to couple switch to parasitic element used in the Modal antenna system Modal antenna system configuration for a 2x2 system Algorithm for Multiple Modal antenna control resident in microprocessor in FEM Algorithm for Multiple Modal antenna control resident in Baseband processor Multiple parasitic elements per antenna associated with multiple frequency bands Algorithm for Multiple Modal antenna control resident in Baseband processor FEM configuration showing switch for modal antenna and switch/duplexer Alternate FEM configuration showing switch for modal antenna and switch/PA/LNA

DISTRIBUTED CONTROL SYSTEM FOR BEAM STEERING APPLICATIONS

CROSS-REFERENCE TO RELATED APPLICATIONS

This application is a continuation of and claims the benefit of priority under 35 U.S.C. § 120 to U.S. patent application Ser. No. 17/233,862, filed Apr. 19, 2021, titled "Distributed Control System for Beam Steering Applications," which, in turn, claims the benefit of priority under 35 U.S.C. § 120 to U.S. patent application Ser. No. 15/828,275, filed Nov. 30, 2017, titled "Distributed Control System for Beam Steering Applications," which, in turn, claims the benefit of priority under 35 U.S.C. § 119(e) to U.S. Provisional Ser. No. 62/428,491, filed Nov. 30, 2016; each of which is hereby incorporated by reference herein in its entirety and for all purposes.

BACKGROUND

Field of the Invention

This application relates to wireless communication; and more particularly, to implementations of active multi-mode antennas in such wireless communication.

Description of the Related Art

As new generations of handsets and other wireless communication devices become smaller and embedded with increased applications, new antenna designs and system configurations are required to enable new capabilities and to improve Quality of Service (QOS). Flexibility in antenna system placement is becoming more important as communication systems transition to higher orders of Multiple Input Multiple Output (MIMO) which results in a larger number of antennas per communication device. Connecting a large number of antennas to a single, multi-port radio will require several of the antennas to be positioned further away from the transceiver or RF front-end compared to an optimized single antenna communication system.

Antenna diversity schemes are used to improve the quality and reliability of a wireless communication link. In many instances, the line of sight between a transmitter and a receiver becomes blocked or shadowed with obstacles such as walls and other objects. Each signal bounce may introduce phase shifts, time delays, attenuations and distortions, which ultimately interfere at the receiving antenna. Destructive interference in the wireless link is problematic and results in degradation of device performance. An antenna diversity scheme can mitigate interference from multipath environments by monitoring one or more CQIs (Channel Quality Indicator). Examples of such quality metrics include signal-to-noise ratio (SNR), signal to interference-plus-noise ratio (SINR), and receive signal strength indicator (RSSI). Antenna diversity can be implemented generally in several forms, including spatial diversity, pattern diversity and polarization diversity, for example.

Pattern diversity generally includes two or more co-located antennas with distinct radiation patterns. This technique utilizes antennas that generate directive beams and are usually separated by a short distance. Collectively, these co-located antennas are capable of discriminating a large portion of angle space and may additionally provide relatively higher gain compared to an omnidirectional antenna.

Polarization diversity generally includes paired antennas with orthogonal polarizations. Reflected signals can undergo polarization changes depending on the medium through which they are traveling. By pairing two complimentary polarizations, this scheme can immunize a system from polarization mismatches that would otherwise cause signal fade.

Active multi-mode antennas, also known as "modal antennas", generally include a relatively small form factor capable of configuration about a plurality of possible antenna modes, wherein the active multi-mode antenna exhibits distinct radiation pattern characteristics in each mode of the plurality of possible antenna modes. As a result, the antenna radiation pattern can be incrementally adjusted or "steered" about the antenna structure, such that a null, or gain, in the antenna radiation pattern can be directionally adjusted (null steering, beam steering, respectively). In addition, a frequency response of the antenna can be adjusted to create or remove one or more resonances, and the resonances can be shifted or tuned to achieve a desired frequency response. Accordingly, beam steering, null steering, and frequency response are each factors which can be controlled by a single active multi-mode antenna.

Prior to the advent of the active multi-mode antenna, engineers would implement various techniques to achieve desired antenna system parameters. For example, one might have provided two distinct antennas, each in a distinct orientation, and a system capable of switching between the two distinctly oriented antennas in order to achieve a desired performance goal.

In another example, two antennas having distinct polarization could be implemented, and the one antenna with better performance according to a desired metric would be selected for operation.

Other conventional techniques include the use of antenna arrays having a plurality of antennas connected therein, and selectively radiating one or more of the plurality of antennas in the array to achieve beam forming and/or beam steering.

In contrast, the active multi-mode antenna includes a single antenna radiating element and one or a plurality of parasitic conductor elements and active components associated therewith which collectively form the multi-mode antenna. The active multi-mode antenna is capable of dynamically adjusting one or more radiation pattern characteristics, such that the multi-mode antenna is adjustable to achieve a desired result. No longer are multiple antennas required to achieve directional nulls, gains and frequency variations.

Examples of multi-mode antennas are described in commonly owned U.S. Pat. Nos. 9,240,634; 8,648,755; 8,362,962; and 7,911,402; the entire contents of each of which is hereby incorporated by reference. Since the structure of a multi-mode antenna is addressed in at least these references, we will not reiterate such descriptions here. Instead, any reviewer of this document may reference the above patent literature for specifics related to the structure of multi-mode antennas.

Beam steering of multi-mode antennas is effectuated with the use of offset parasitic elements that alter the current distribution on the driven antenna as the reactive load on the parasitic is varied. This beam steering technique where multiple modes are generated is a multi-mode antenna technique, and an antenna configured to alter radiating modes in this fashion will be referred to here as a multi-mode antenna. The radiation modes generated from the multi-mode antenna have different radiation pattern shapes and polarization compared to one another, resulting in both pattern and polarization diversity from a single antenna structure. An optimized multi-mode antenna will require a multi-port switch placed at a parasitic element, with this parasitic element closely coupled to the single driven antenna element. The multi-port switch will typically have the common port attached to one end of the parasitic element, with reactive loads connected to the additional switch ports. The second connection point of the reactive loads are connected to system ground, effectively grounding the reactive components connected to the switch ports.

Previous multi-mode antennas developed for beam steering operation have had the switch used to change the radiation mode positioned at the parasitic element. This technique has worked well in single antenna implementations or implementations where there is area available on the host circuit board for a switch to be placed at each multi-mode antenna and control lines to route to each multi-mode antenna. With the telecommunications industry moving towards single chip solutions for sub-systems such as front-end modules (FEM) and where it is advantageous to located the FEM at the transceiver and where multiple antennas are implemented in a MIMO (Multiple Input Multiple Output) configuration, a method of locating the switch remote from the multi-mode antenna will be required.

SUMMARY

An antenna system is disclosed, the antenna system comprising: a first active multi-mode antenna, the first active multi-mode antenna including: (i) a first antenna radiating element positioned above a ground plane and forming an antenna volume therebetween; (ii) a first parasitic element positioned outside of the antenna volume and adjacent to the first antenna radiating element, wherein said first parasitic element is configured to provide a first electromagnetic coupling between the first antenna radiating element and the first parasitic element; and (iii) a first active tuning component or circuit coupled to the first parasitic element and configured to vary a reactance associated with the first parasitic element for actively changing a radiation pattern of the first active multi-mode antenna; characterized in that the antenna system further comprises: (iv) a first transmission line having a first end and a second end, the first end of the first transmission line being coupled to the first parasitic element, and the second end of the first transmission line being coupled to a port associated with the first active tuning component or circuit; wherein the first active tuning component or circuit is integrated within a front-end module associated with a communication system.

In addition, a technique is described where the switch and/or tunable control circuit for use with an active multi-mode antenna is positioned remote from the antenna structure itself for integration into host communication systems. Electrical delay and impedance characteristics are compensated for in the design and configuration of transmission lines or parasitic elements as the active multi-mode antenna structure is positioned in optimal locations such that significant electrical delay is introduced between the RF front-end circuit and multi-mode antenna. This technique can be implemented in designs where it is convenient to locate switches in a front-end module (FEM) and the FEM is located in vicinity to the transceiver.

BRIEF DESCRIPTION OF THE DRAWINGS

FIG. 2(*a*) illustrates a multi-mode antenna configuration wherein two parasitic elements are used to generate the radiation modes and to maintain a constant frequency response.

FIG. 2(*b*) illustrates a multi-mode antenna configuration wherein one parasitic element is used to generate the radiation modes while keeping the frequency response of the antenna constant.

FIG. 4(*b*) illustrates an example of a multi-mode antenna where the switch used to generate the modes is integrated in the FEM.

FIG. 7(*b*) illustrates an example of the multi-mode antenna system where three parasitic elements are used to couple a switch to the multi-mode antenna element, with the first parasitic element coupling to the second parasitic element and this second parasitic element coupled to the third parasitic element, which in turn couples to the multi-mode antenna element.

DETAILED DESCRIPTION

Figure 1:
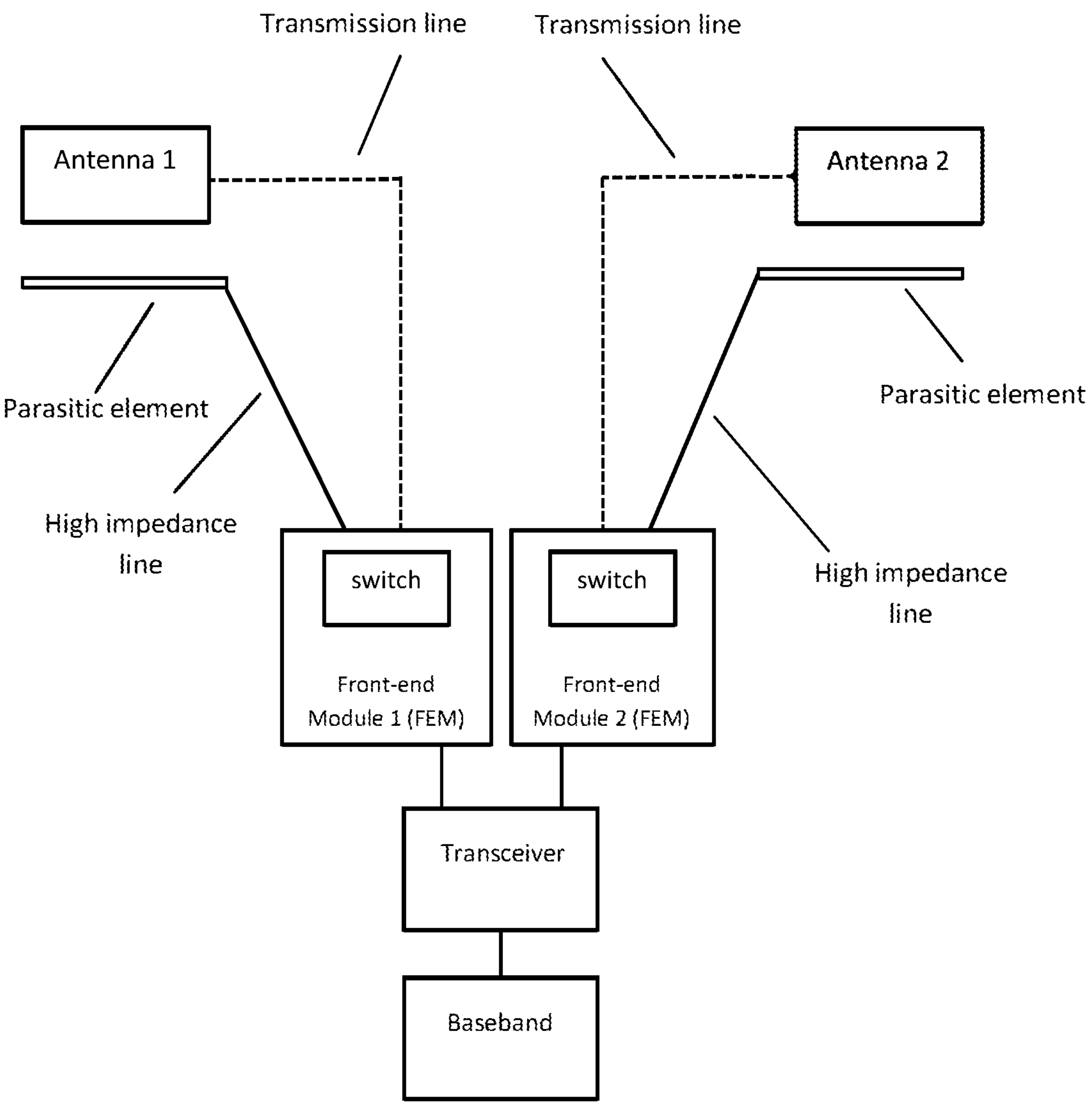
FIG. 1 shows a communication system with two multi-mode antennas and two front-end modules (FEMs) integrated with transceiver and baseband circuits.

An antenna system and related technique is described where a switch and/or tunable control circuit for a multi-mode antenna system is positioned remote from the antenna structure and integrated into a host communication system. Electrical delay and impedance characteristics are compensated for in the design and configuration of transmission lines or parasitic elements as the multi-mode antenna structure is positioned remote from the RF front-end circuit and transceiver. This technique can be implemented in designs where it is required to locate switches in a front-end module (FEM) for size or cost considerations and the FEM is located at a distance from the multi-mode antenna. This technique will allow for integration of the switch function into another RFIC such as the FEM found in most radios.

In one embodiment of the present invention, a multi-mode antenna is positioned on the circuit board of a host communication device with the switch used to alter the reactive loading on the coupled parasitic element associated with the multi-mode antenna located at a distance from the parasitic element. A transmission line is used to connect the switch to the parasitic element and the characteristic impedance of the transmission line is adjusted to optimize the correlation coefficient between modes generated by the multi-mode antenna, the frequency bandwidth of the multi-mode antenna, and/or the return loss of the various modes generated by the multi-mode antenna. The transmission line used to connect the switch to the parasitic element can take the form of a coaxial transmission line, a microstrip transmission line, a co-planar transmission line, a stripline structure, or a parallel wire configuration.

In another embodiment of the present invention, the switch used to alter the reactive loading on the coupled parasitic element associated with the multi-mode antenna located at a distance from the parasitic element is connected to the parasitic element using a control line etched or fabricated into the circuit board of the host communication device. This control line can be a control line typically used for GPIO (general purpose input output), SPI (serial peripheral interface), MIPI (mobile industry processor interface), or other types of digital control interfaces. A single conductive trace is used for the connection between switch and parasitic element, with the trace connected to the end of the parasitic element closest to the ground layer of the circuit board. An impedance transformer or matching circuit can be implemented at the switch/control line junction or at the control line/parasitic element junction, with this transformer or matching circuit used to optimize the operation of the mode generation of the multi-mode antenna.

In another embodiment of the present invention, the switched used as part of the multi-mode antenna is located within a front-end module (FEM) of a communication system. Locating the switch in the FEM provides cost and size reduction benefits when compared to the switch being located at the parasitic element of the multi-mode antenna. In addition, area or volume savings are realized since traces for power and control signals to the switch are no longer required to be etched into the host circuit board at the multi-mode antenna. Embedding the switch into an existing RFIC such as a FEM provides substantial cost savings and coincides with the trend in the communications industry to develop and implement “systems on a chip” where higher orders of integration occur to reduce the component count in a system.

In yet another embodiment of the present invention, two or more multi-mode antennas can be integrated into a communication system for MIMO capability where these two or more antennas transmit and receive signals. For these situations where multiple multi-mode antennas are integrated into a single communication device all of the switches required to implement the multi-mode antenna technique can be integrated in the FEMs to optimize the radio system layout. The multiple FEMs can be located in proximity to the single multi-port transceiver to reduce transmission line length between the transceiver and FEMs, which will reduce losses and electrical delay. The multiple multi-mode antennas can be positioned in locations to optimize isolation and correlation in the antenna system without regards to routing control and power signals to switches located at the multi-mode antennas.

In another embodiment of the present invention, a multi-mode antenna can be configured where an antenna element is positioned in close proximity to a first parasitic element. A second parasitic element is positioned in proximity to the first parasitic element with this second parasitic element coupled to a switch. This switch is used to generate the various modes of the multi-mode antenna by changing the reactive loading on the second parasitic element which couples to the first parasitic element, and where the first parasitic element couples to the antenna element. This configuration provides a method of coupling a switch positioned at a distance to an antenna element and parasitic element pair to form a multi-mode antenna capable of generating multiple modes. The coupling mechanism between the pair of parasitic elements can be controlled by the spacing and orientation between parasitic elements. The two parasitic elements can be positioned parallel to each other or the second parasitic element can be positioned such that it is non-parallel to the first parasitic element. As previously described the switch can be connected to the second parasitic element using a control line or transmission line to further extend the distance between the multi-mode antenna and switch. The switch can be integrated within the FEM or transceiver to simplify the design and layout of the radio system.

In another embodiment of the present invention, a multi-mode antenna connected to a FEM will have a plurality of parasitic elements coupled to the multi-mode antenna, with each parasitic element connected to a switch within the FEM to provide a capability to alter the radiation mode of the multi-mode antenna.

Now turning to the drawings, FIG. 1 illustrates an example of a communication system where two multi-mode antennas and two front-end modules (FEMs) are integrated with transceiver and baseband circuits. The switch required to generate the radiation modes of each multi-mode antenna is integrated into the FEM. A high impedance line is used to connect each switch to the parasitic element of each multi-mode antenna.

FIG. 2(*a*) illustrates a multi-mode antenna configuration wherein two parasitic elements are used to generate the radiation modes and to maintain a constant frequency response.

FIG. 2(*b*) illustrates a multi-mode antenna configuration wherein one parasitic element is used to generate the radiation modes while keeping the frequency response of the antenna constant.

Figure 3:
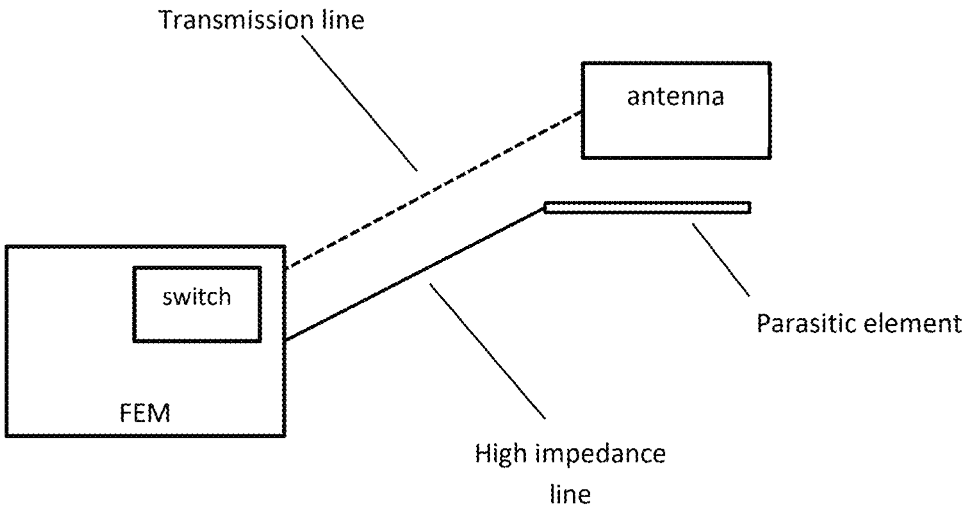
FIG. 3 illustrates an example of a multi-mode antenna where the switch used to generate the modes is integrated in the FEM.

FIG. 3 illustrates an example of a multi-mode antenna where the switch used to generate the modes is integrated in the FEM. A transmission line is used to connect the switch to the multi-mode antenna element. A high impedance line is used to connect the switch to the offset parasitic element.

Figure 4A:
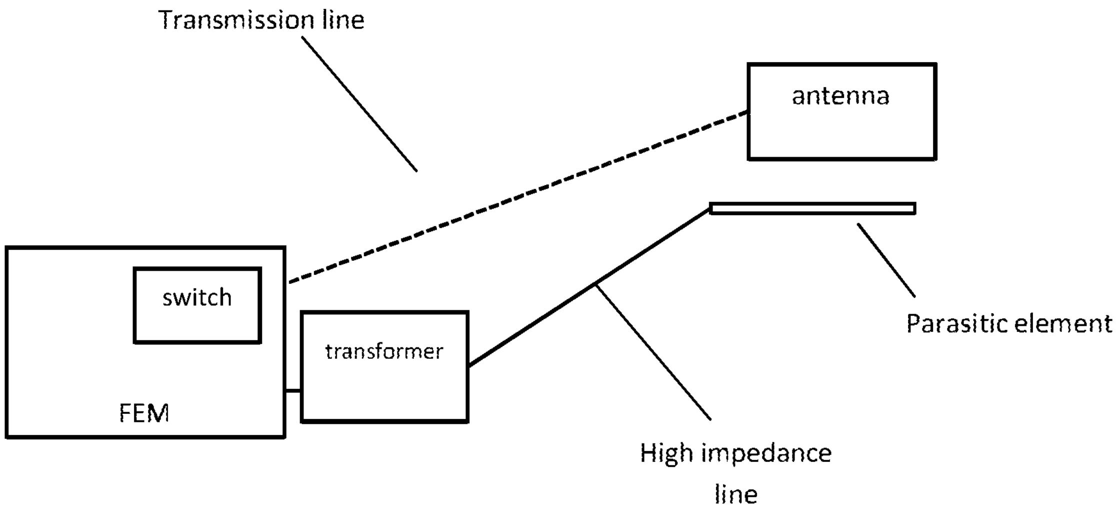
FIG. 4(*a*) illustrates an example of a multi-mode antenna where the switch used to generate the modes is integrated in the FEM.
Figure 4B:
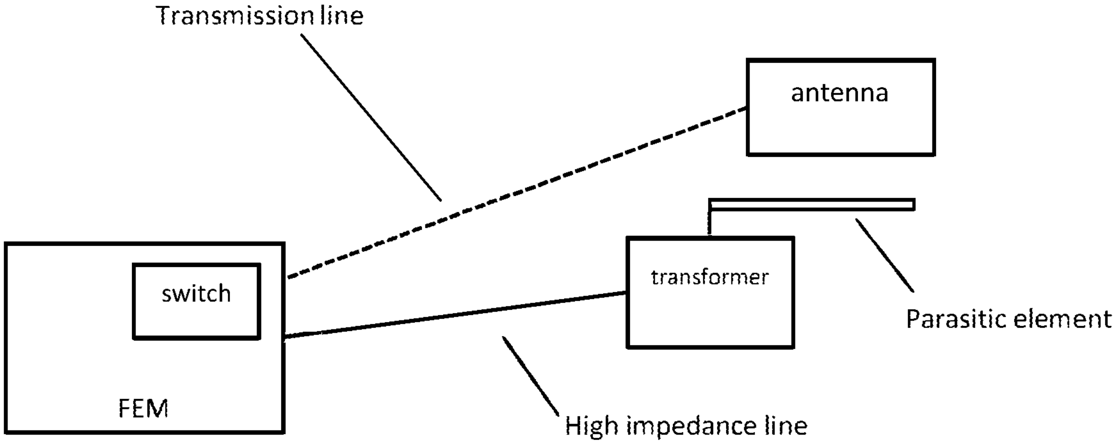

FIG. 4(*a*) illustrates an example of a multi-mode antenna where the switch used to generate the modes is integrated in the FEM. A transmission line is used to connect the switch to the multi-mode antenna element. A high impedance line is used to connect the switch to the offset parasitic antenna. A transformer circuit is positioned at the junction of the FEM and the high impedance line, with this transformer used to optimize the multi-mode antenna system.

FIG. 4(*b*) illustrates an example of a multi-mode antenna where the switch used to generate the modes is integrated in the FEM. A transmission line is used to connect the switch to the multi-mode antenna element. A high impedance line is used to connect the switch to the offset parasitic antenna. A transformer circuit is positioned at the junction of the high impedance line and the parasitic element, with this transformer used to optimize the multi-mode antenna system.

Figure 5:
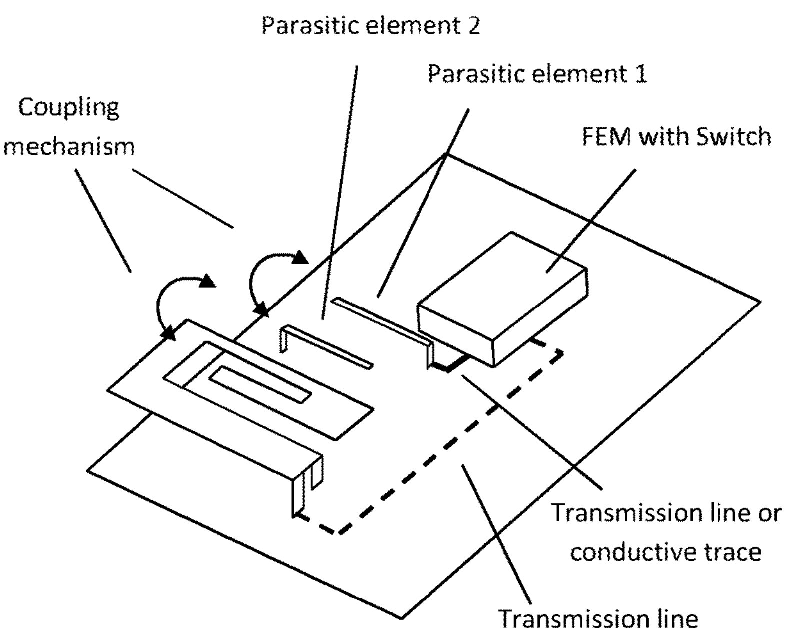
FIG. 5 illustrates an example of a multi-mode antenna system where a first parasitic element is connected to the switch located in a FEM, with this switch dedicated for use in generating modes of the multi-mode antenna.

FIG. 5 illustrates an example of a multi-mode antenna system where a first parasitic element is connected to the switch located in a FEM, with this switch dedicated for use in generating modes of the multi-mode antenna. The first parasitic element couples to a second parasitic element which is positioned next to it, with this second parasitic element used to couple to the multi-mode antenna element.

Figure 6:
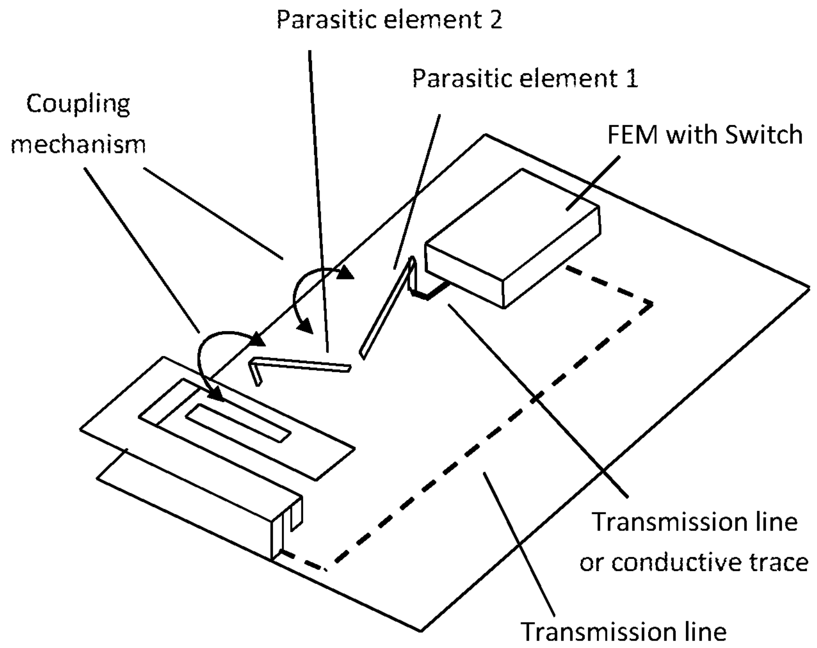
FIG. 6 illustrates an example as described in FIG. 5 where two parasitic elements are used to couple to the multi-mode antenna.

FIG. 6 illustrates an example as described in FIG. 5 where two parasitic elements are used to couple to the multi-mode antenna. In this configuration the parasitic elements are positioned such that the parasitic elements are not parallel to each other.

Figure 7A:
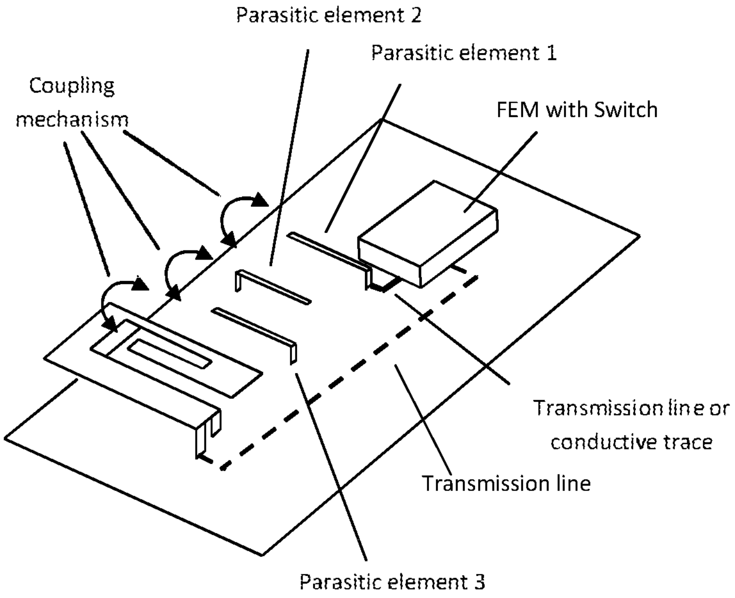
FIG. 7(*a*) illustrates an example of the multi-mode antenna system where three parasitic elements are used to couple a switch to the multi-mode antenna element, with the first parasitic element coupling to the second parasitic element and this second parasitic element coupled to the third parasitic element, which in turn couples to the multi-mode antenna element.
Figure 7B:
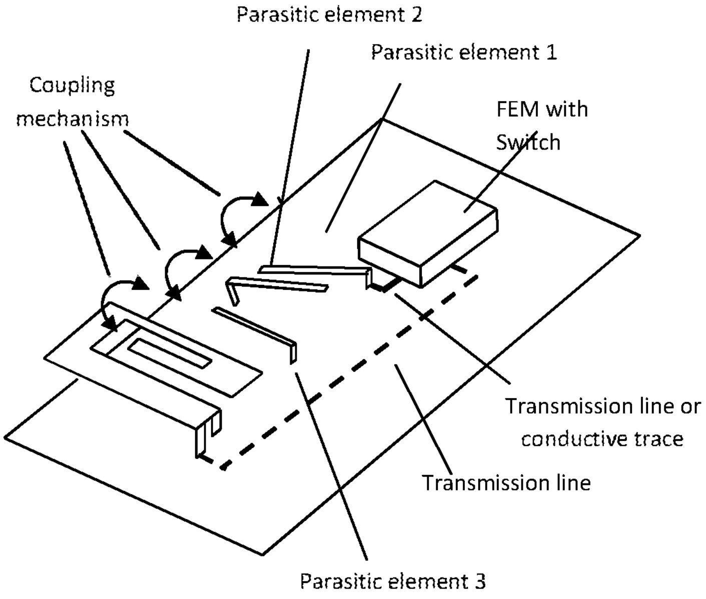

FIG. 7(*a*) illustrates an example of the multi-mode antenna system where three parasitic elements are used to couple a switch to the multi-mode antenna element, with the first parasitic element coupling to the second parasitic element and this second parasitic element coupled to the third parasitic element, which in turn couples to the multi-mode antenna element.

FIG. 7(*b*) illustrates an example of the multi-mode antenna system where three parasitic elements are used to couple a switch to the multi-mode antenna element, with the first parasitic element coupling to the second parasitic element and this second parasitic element coupled to the third parasitic element, which in turn couples to the multi-mode antenna element. In this configuration the parasitic elements are positioned such that they are not parallel to each other.

Figure 8:
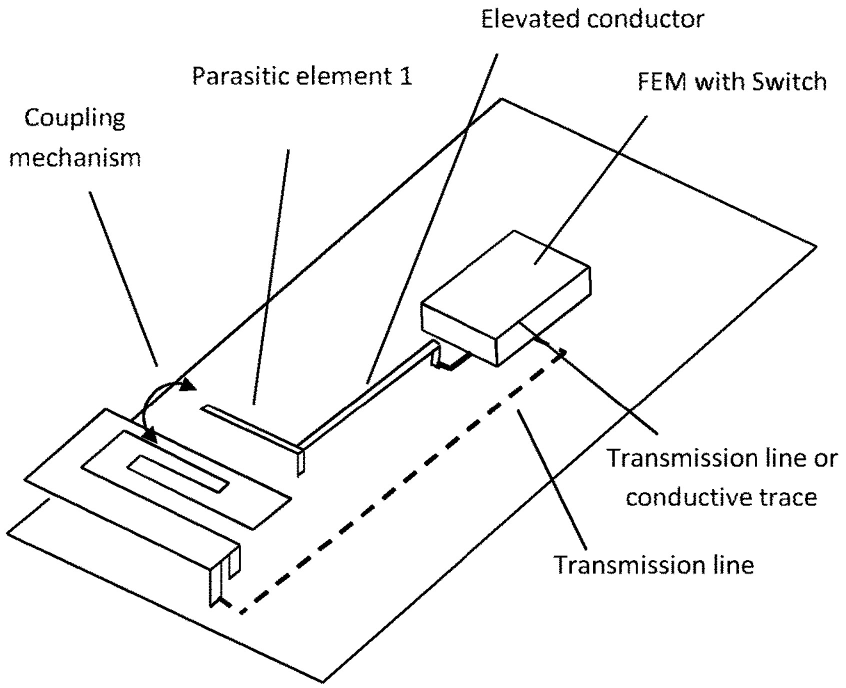
FIG. 8 shows a multi-mode antenna system where a switch located in a FEM is connected to a conductor that is elevated above a ground plane, with this elevated conductor attached to a parasitic element.

FIG. 8 is a multi-mode antenna system where a switch located in a FEM is connected to a conductor that is elevated above a ground plane, with this elevated conductor attached to a parasitic element. The parasitic element couples to the multi-mode antenna element. The purpose of the elevated conductor is to couple the switch to the parasitic element.

Figure 9:
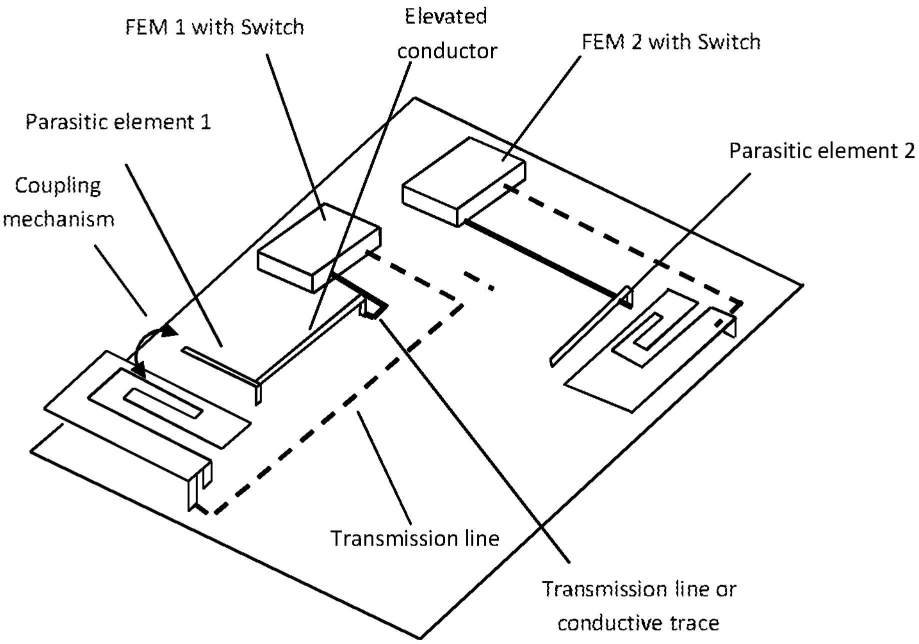
FIG. 9 illustrates a two multi-mode antenna system where two multi-mode antennas are connected to two FEMs.

FIG. 9 illustrates a two multi-mode antenna system where two multi-mode antennas are connected to two FEMs.

Figure 10:
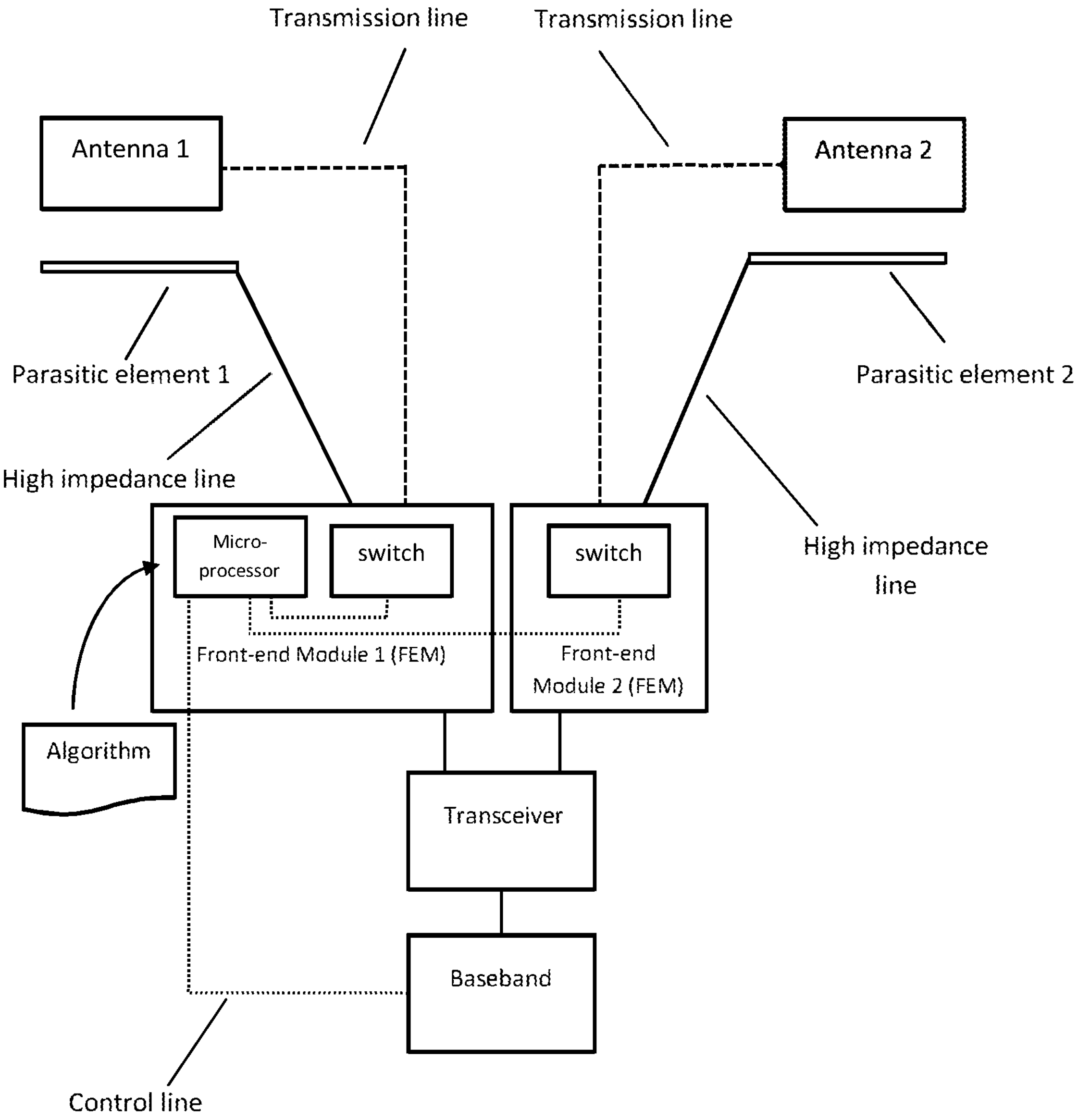
FIG. 10 illustrates a block diagram of a communication system consisting of two multi-mode antennas, two FEMs, a transceiver, and a baseband processor.

FIG. 10 illustrates a block diagram of a communication system consisting of two multi-mode antennas, two FEMs, a transceiver, and a baseband processor. The algorithm used to control the two multi-mode antennas is located in a microprocessor of the first FEM, and a control line connects the first FEM to the second FEM to provide control of the second multi-mode antenna.

Figure 11:
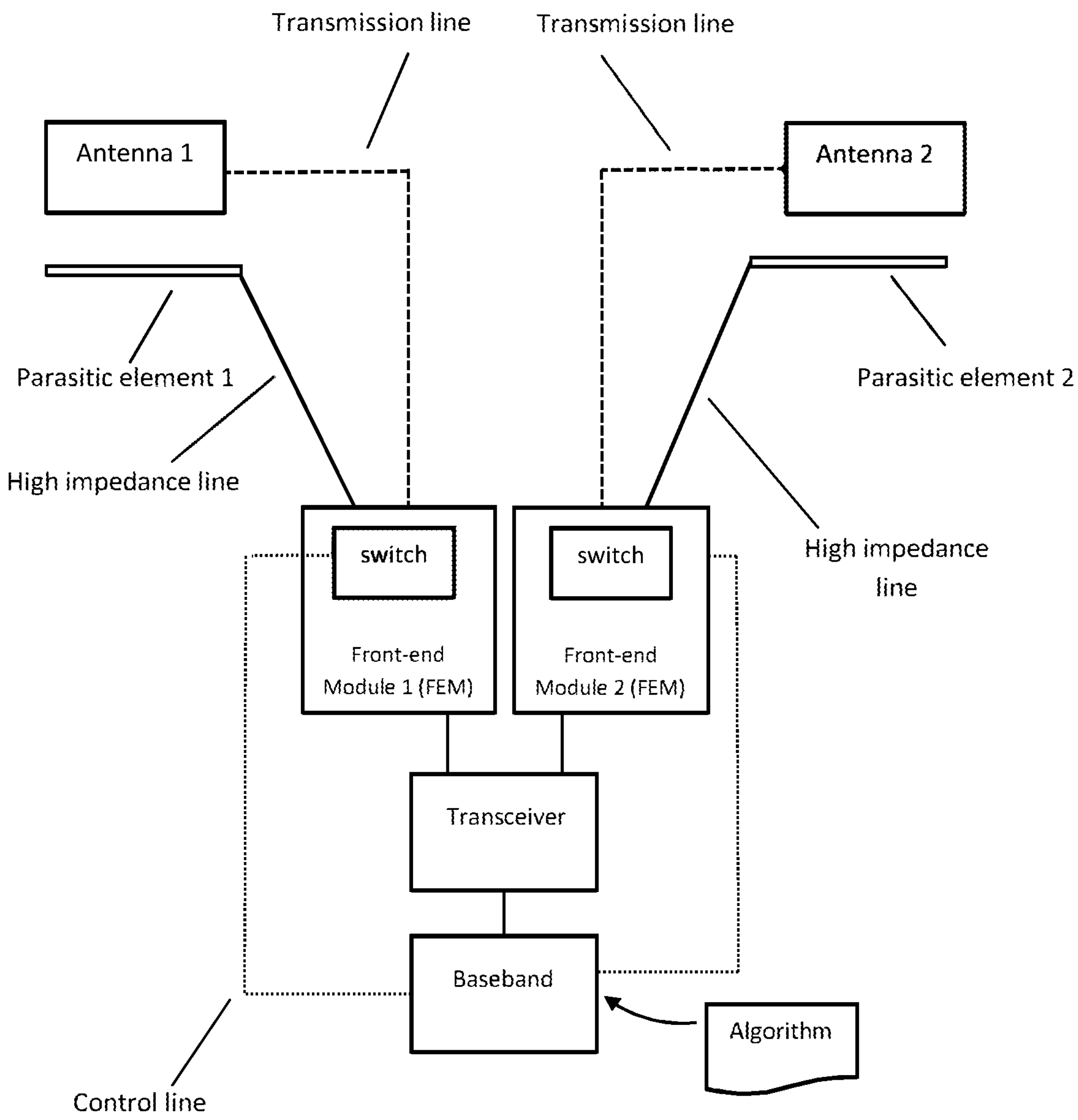
FIG. 11 illustrates a block diagram of a communication system consisting of two multi-mode antennas, two FEMs, a transceiver, and a baseband processor.

FIG. 11 illustrates a block diagram of a communication system consisting of two multi-mode antennas, two FEMs, a transceiver, and a baseband processor. The algorithm used to control the two multi-mode antennas is located in the baseband processor and a control lines connect the baseband processor to the first and second FEMs.

Figure 12:
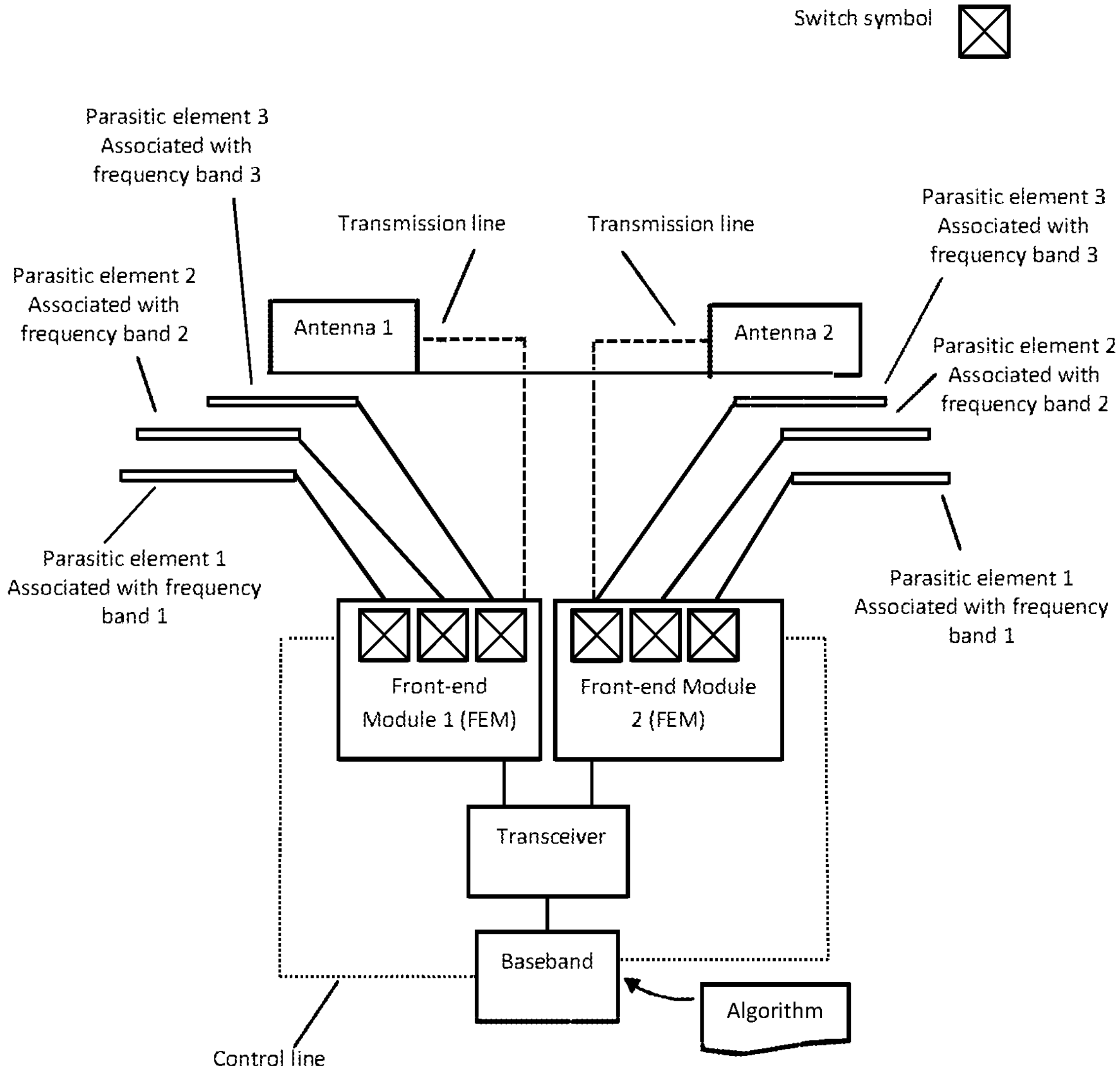
FIG. 12 illustrates a two multi-mode antenna system where two multi-mode antennas are connected to two FEMs.

FIG. 12 illustrates a two multi-mode antenna system where two multi-mode antennas are connected to two FEMs. There are three parasitic elements coupled to each multi-mode antenna. Each FEM contains three switches, with one switch associated with each parasitic element. Each parasitic element is configured to operate at a specific frequency band.

Figure 13:
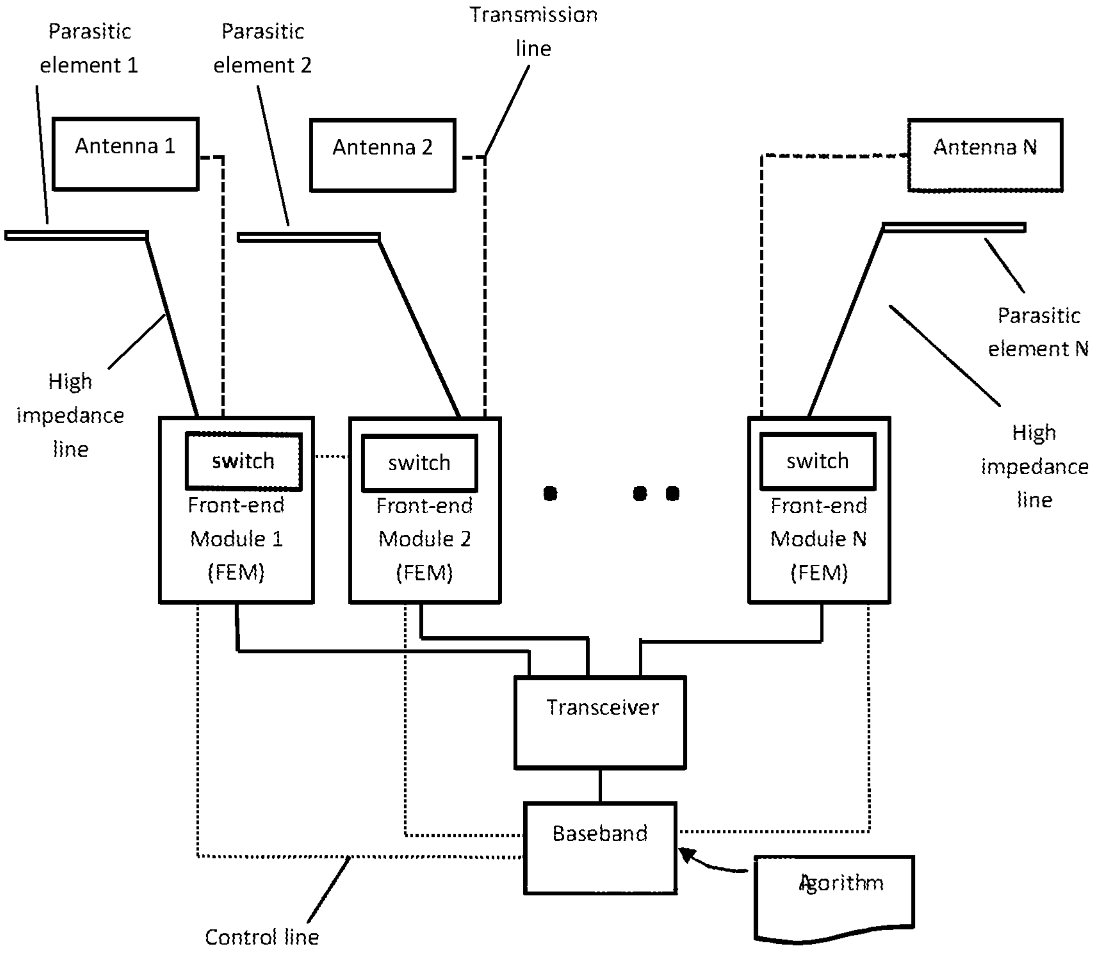
FIG. 13 illustrates an N multi-mode antenna system where N multi-mode antennas and FEMs are implemented to provide a multi-antenna communication system.

FIG. 13 illustrates an N multi-mode antenna system where N multi-mode antennas and FEMs are implemented to provide a multi-antenna communication system.

Figure 14:
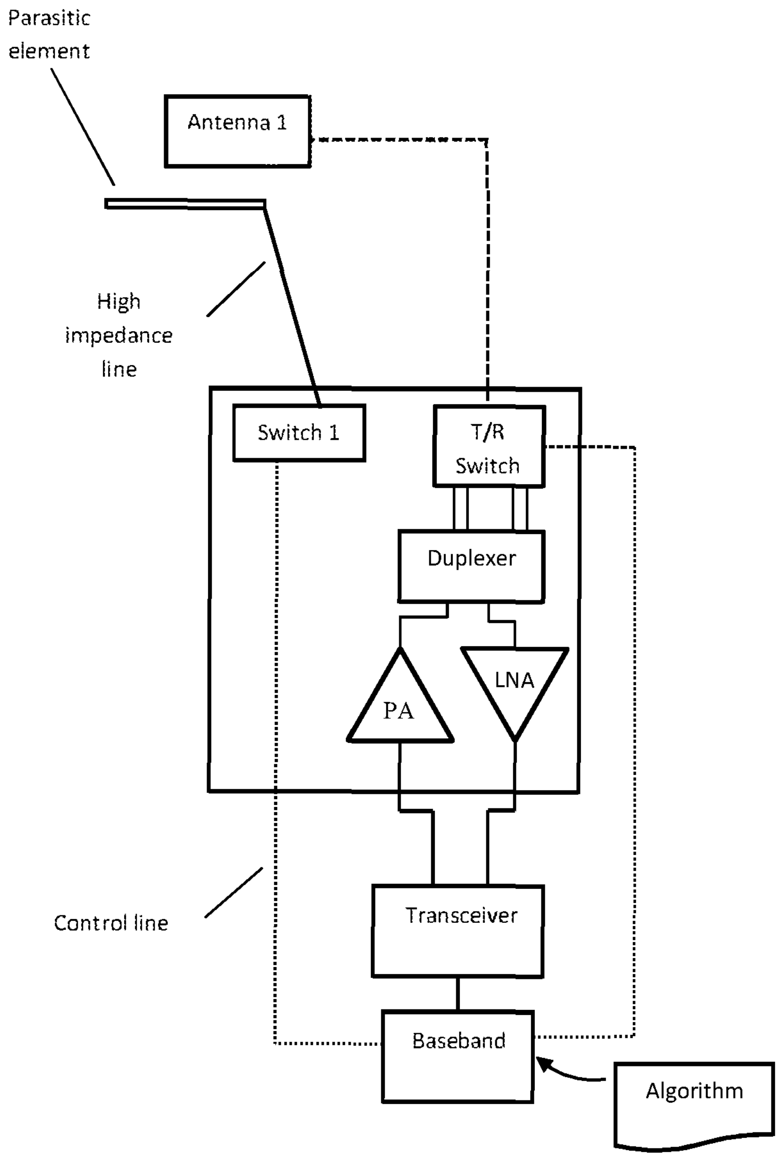
FIG. 14 illustrates a front-end module and multi-mode antenna configuration.

FIG. 14 illustrates a front-end module and multi-mode antenna configuration. Switch 1 is used to control the mode selection of the multi-mode antenna while the T/R switch is used to couple the duplexer to the multi-mode antenna. The duplexer couples the PA (power amplifier) and LNA (low noise amplifier) to the T/R switch.

Figure 15:
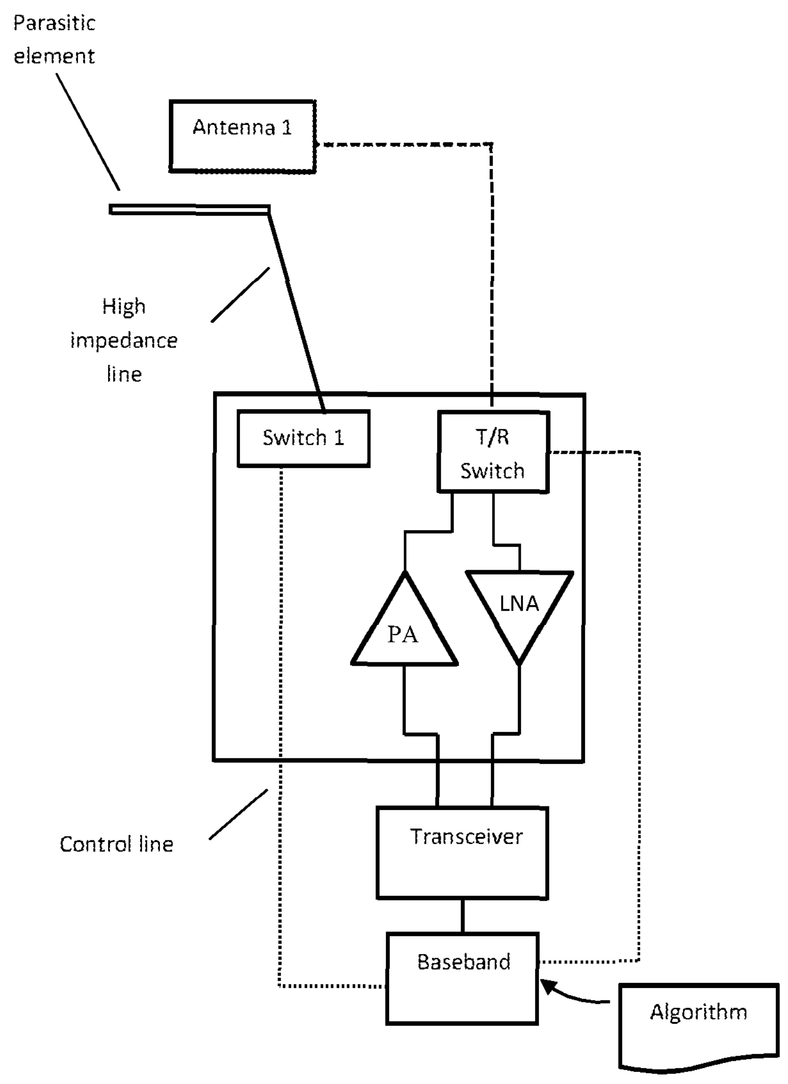
FIG. 15 illustrates a front-end module and multi-mode antenna configuration.

FIG. 15 illustrates a front-end module and multi-mode antenna configuration. Switch 1 is used to control the mode selection of the multi-mode antenna while the T/R switch is used to couple the multi-mode antenna to the power amplifier (PA) and low noise amplifier (LNA).

What is claimed is:

1. An antenna system, comprising:
- a ground plane;
- a first multi-mode antenna, comprising:
  - a first radiating element spaced apart from the ground plane and defining a first antenna volume therebetween;
  - a first parasitic element spaced apart from the ground plane, the first parasitic element positioned outside of the first antenna volume and adjacent to the first radiating element; and
  - a first active tuning circuit integrated with a first front-end module; and
- a second multi-mode antenna, comprising:
  - a second radiating element spaced apart from the ground plane and defining a second antenna volume therebetween;
  - a second parasitic element spaced apart from the ground plane, the second parasitic element positioned outside of the second antenna volume and adjacent to the second radiating element; and
  - a second active tuning circuit integrated with a second front-end module;
- the first front-end module and the second front-end module being associated with a communication system.

2. The antenna system of claim 1, wherein:
- the first active tuning circuit configured to vary a reactance associated with the first parasitic element; and
- the second active tuning circuit configured to vary a reactance associated with the second parasitic element.

3. The antenna system of claim 2, wherein the first active tuning circuit is configured to configure the first multi-mode antenna in one of the plurality of modes.

4. The antenna system of claim 2, wherein the second active tuning circuit is configured to configure the second multi-mode antenna in one of the plurality of modes.

5. The antenna system of claim 1, further comprising: a first switch disposed within the first front-end module and coupled to the first parasitic element; and a second switch disposed within the second front-end module and coupled to the second parasitic element.

6. The antenna system of claim 5, wherein:
- the first switch is configured to generate a radiation mode of a plurality of radiation modes of the first multi-mode antenna, and
- the second switch is configured to generate a radiation mode of a plurality of radiation modes of the second multi-mode antenna.

7. The antenna system of claim 1, further comprising: a transceiver coupled to the first front-end module and the second front-end module; a baseband processor coupled to the transceiver; a control line coupling the first front-end module to the second front-end module; and an algorithm stored in a microprocessor of the first front-end module, wherein the algorithm is configured to control the first multi-mode antenna and the second multi-mode antenna.

8. The antenna system of claim 1, further comprising: a transceiver coupled to the first front-end module and the second front-end module; a baseband processor coupled to the transceiver; a first control line coupling the baseband processor to the first front-end module; a second control line coupling the baseband processor to the second front-end module; and an algorithm.

9. The antenna system of claim 1, wherein the first multi-mode antenna further comprises a conductor positioned above the ground plane and adjacent to the first parasitic element.

10. The antenna system of claim 9, wherein the conductor is coupled between the first parasitic element and the first active tuning circuit.

11. The antenna system of claim 1, wherein the first multi-mode antenna is configurable in a plurality of modes, each of the plurality of modes having a distinct radiation pattern.

12. The antenna system of claim 1, wherein the second multi-mode antenna is configurable in a plurality of modes, each of the plurality of modes having a distinct radiation pattern.

13. The antenna system of claim 1, wherein the first radiating element comprises:

a vertical portion disposed on the ground plane; and a horizontal portion extending from the vertical portion.

14. The antenna system of claim 1, wherein the second radiating element comprises:

a vertical portion disposed on the ground plane; and a horizontal portion extending from the vertical portion.

15. The antenna system of claim 1, further comprising:

a first transmission line coupled between the first radiating element and the first active tuning circuit; and a second transmission line coupled between the second radiating element and the second active tuning circuit.

16. The antenna system of claim 15, wherein:

the first transmission line comprises a coaxial transmission line, a microstrip transmission line, a stripline transmission line, a co-planar waveguide, or a parallel wire transmission line; and the second transmission line comprises a coaxial transmission line, a microstrip transmission line, a stripline transmission line, a co-planar waveguide, or a parallel wire transmission line.

17. The antenna system of 15, wherein:

the first transmission line comprises a single conductive trace; and the second transmission line comprises a single conductive trace or a plurality of traces.

18. The antenna system of claim 1, wherein:

the first parasitic element is configured to provide electromagnetic coupling between the first radiating element and the first parasitic element; and the second parasitic element is configured to provide electromagnetic coupling between the second radiating element and the second parasitic element.

* * * * *